No. 607,640. Patented July 19, 1898.
F. SCHNEIDER.
TRANSMISSION GEARING.
(Application filed Oct. 26, 1896.)
(No Model.) 6 Sheets—Sheet 1.

Witnesses
John P. Nordstrom
A.W. King

Frederick Schneider Inventor
By his Attorneys
Schreiter & Van Oderstine

No. 607,640. Patented July 19, 1898.
F. SCHNEIDER.
TRANSMISSION GEARING.
(Application filed Oct. 26, 1896.)
(No Model.) 6 Sheets—Sheet 3.
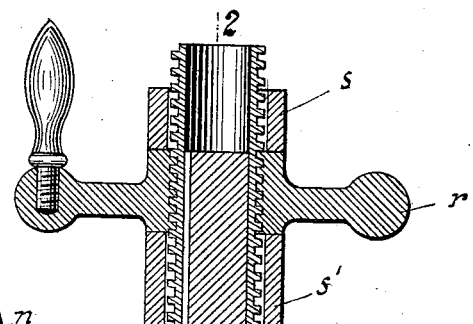
Fig. 3.
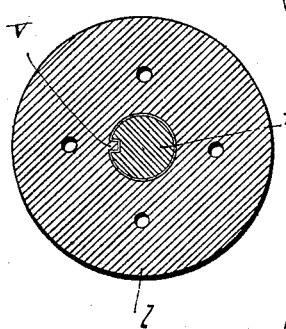
Fig. 4.
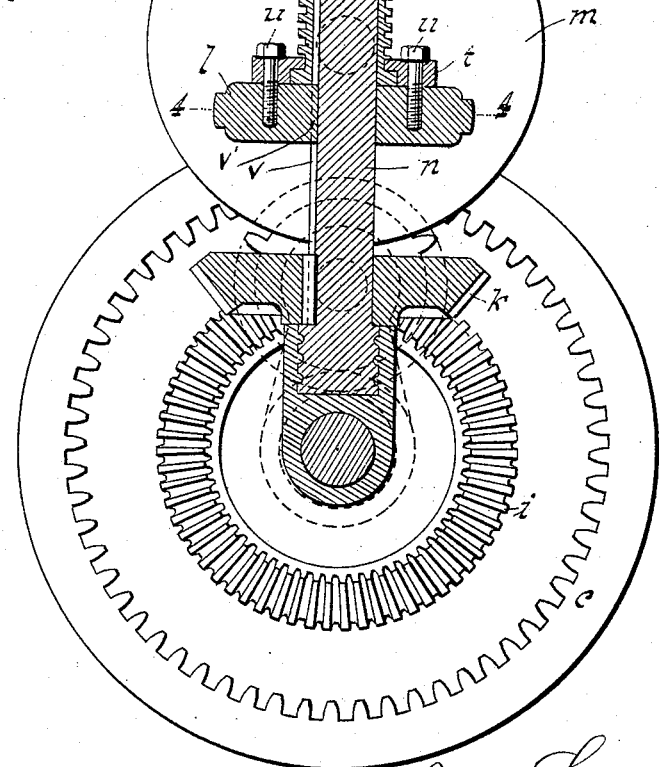
Witnesses
John P. Nordstrom
Frederick Schneider, Inventor
By his Attorney
Schreiter & Van Iderstine

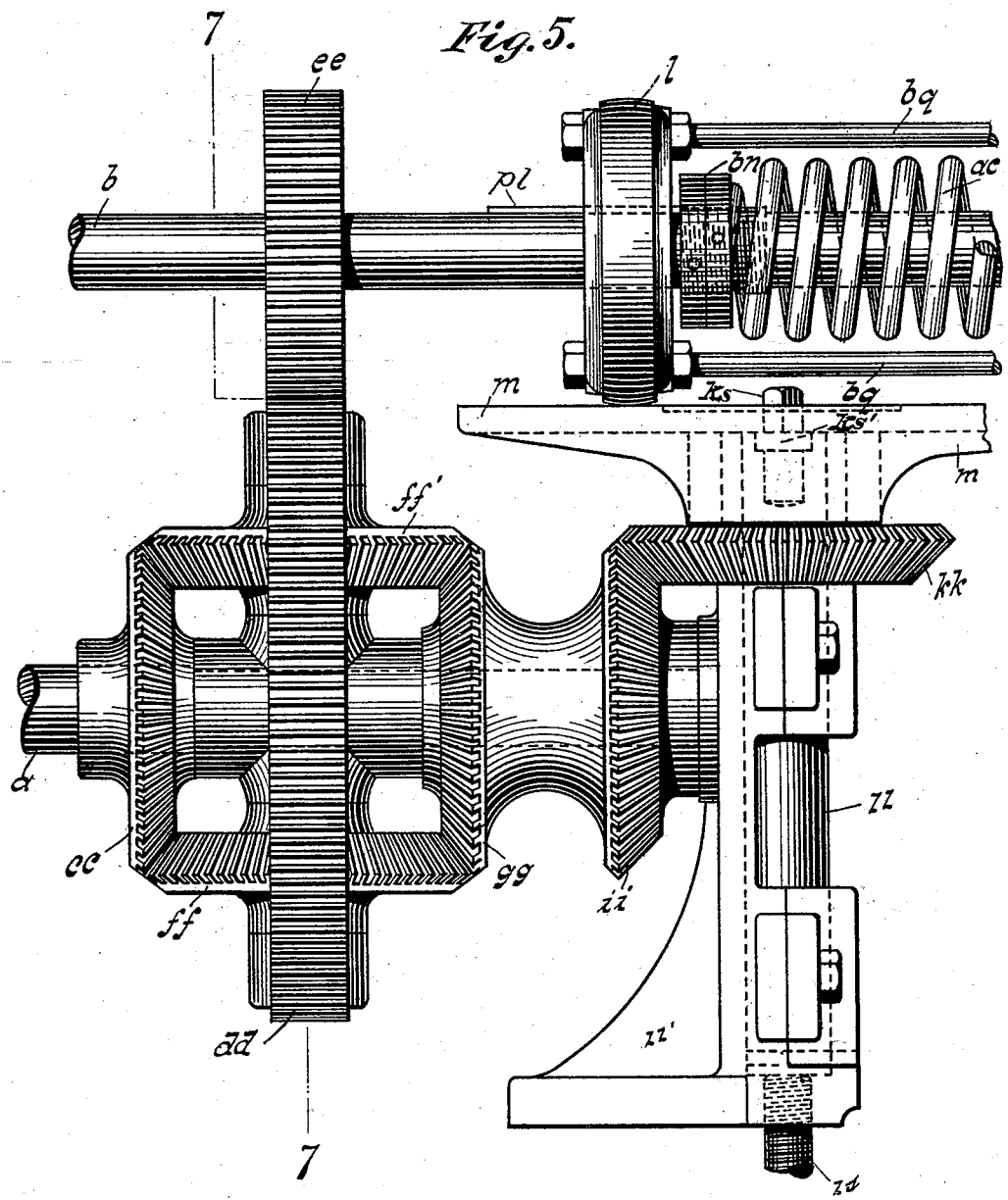

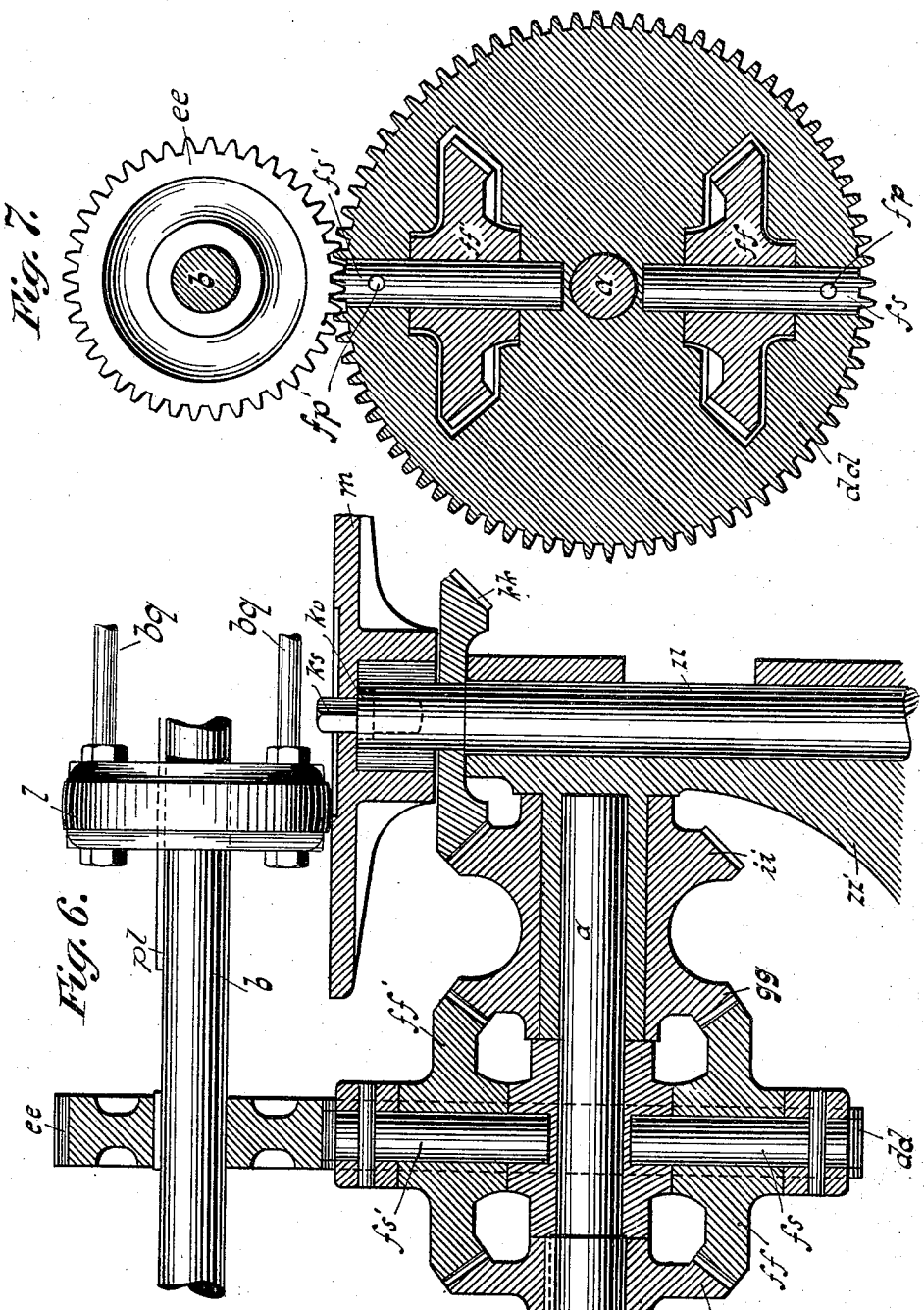

No. 607,640. Patented July 19, 1898.
F. SCHNEIDER.
TRANSMISSION GEARING.
(Application filed Oct. 26, 1896.)
(No Model.) 6 Sheets—Sheet 6.
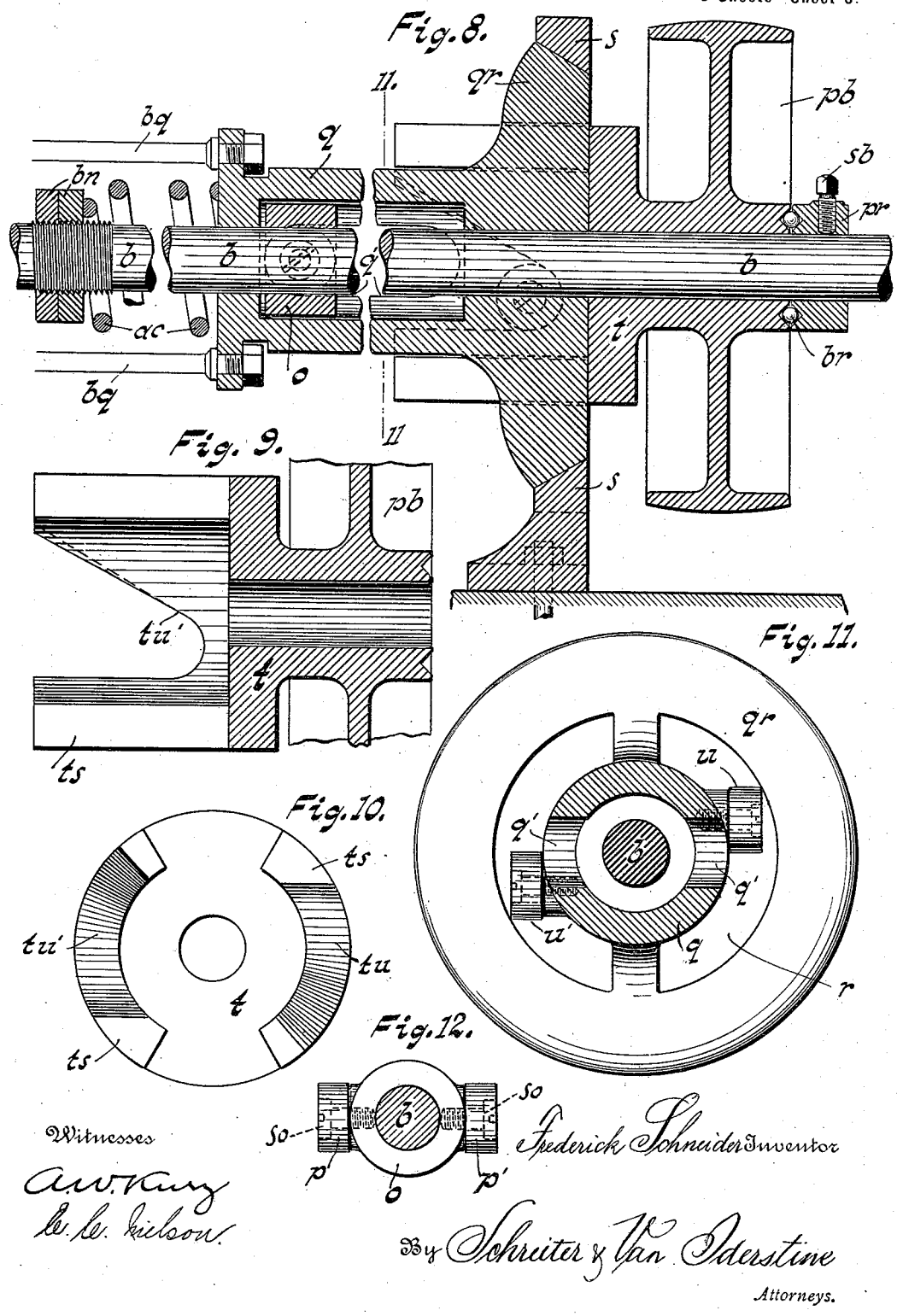

UNITED STATES PATENT OFFICE.

FREDERICK SCHNEIDER, OF ERIE, PENNSYLVANIA.

TRANSMISSION-GEARING.

SPECIFICATION forming part of Letters Patent No. 607,640, dated July 19, 1898.

Application filed October 26, 1896. Serial No. 610,148. (No model.)

*To all whom it may concern:*

Be it known that I, FREDERICK SCHNEIDER, a citizen of the United States, residing in Erie, county of Erie, and State of Pennsylvania, have invented certain new and useful Improvements in Transmission-Gearings, of which the following is a specification.

My invention relates to machinery for transmitting motion and power; and it consists of the herein-described transmission-gears whereby from a shaft rotating at a constant speed another shaft is driven at a variable speed, this speed being adjustable either at will or automatically controlled by the change of the load on the driven shaft.

My invention is illustrated in the accompanying drawings, wherein—

Figure 1:
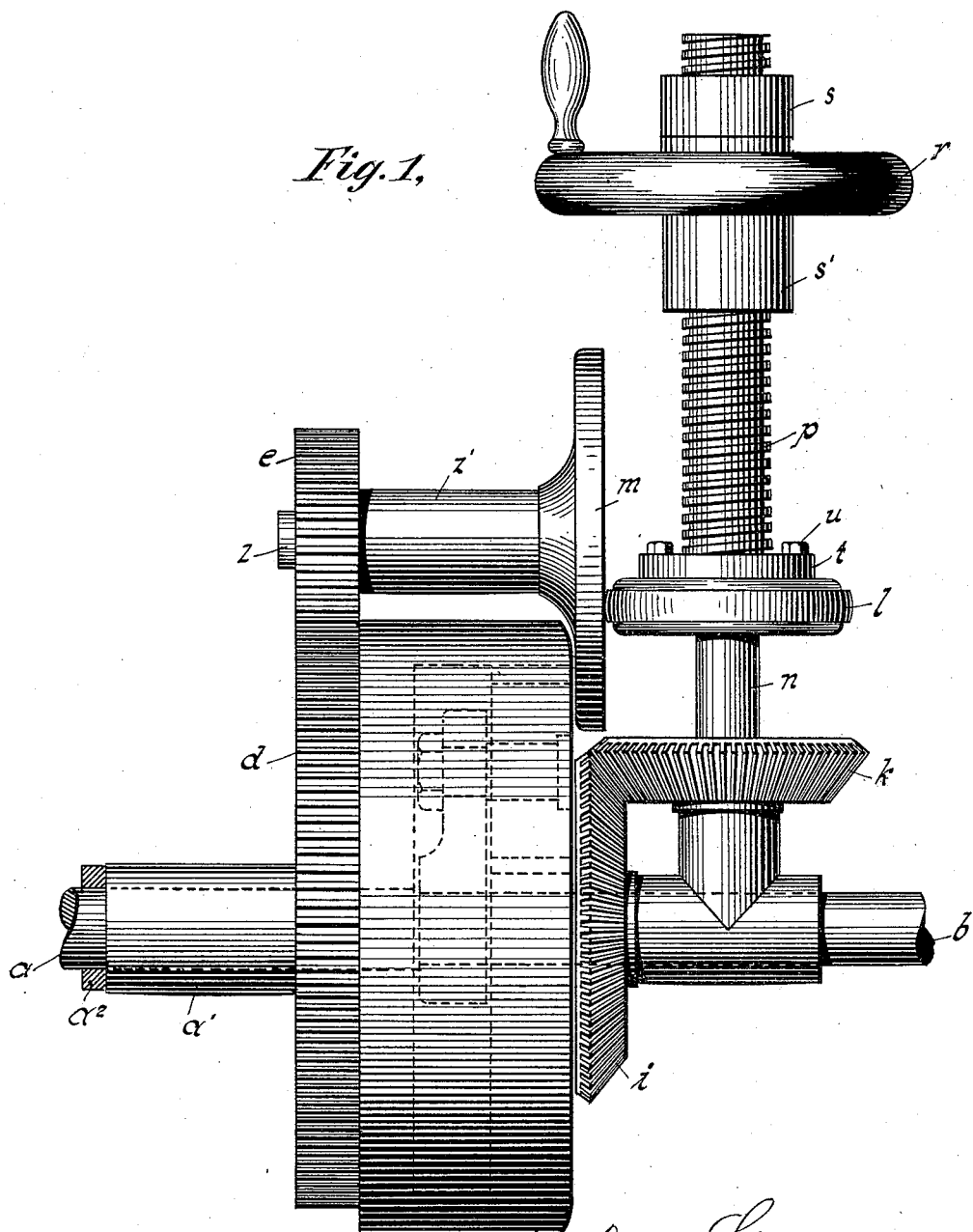
Figure 2:
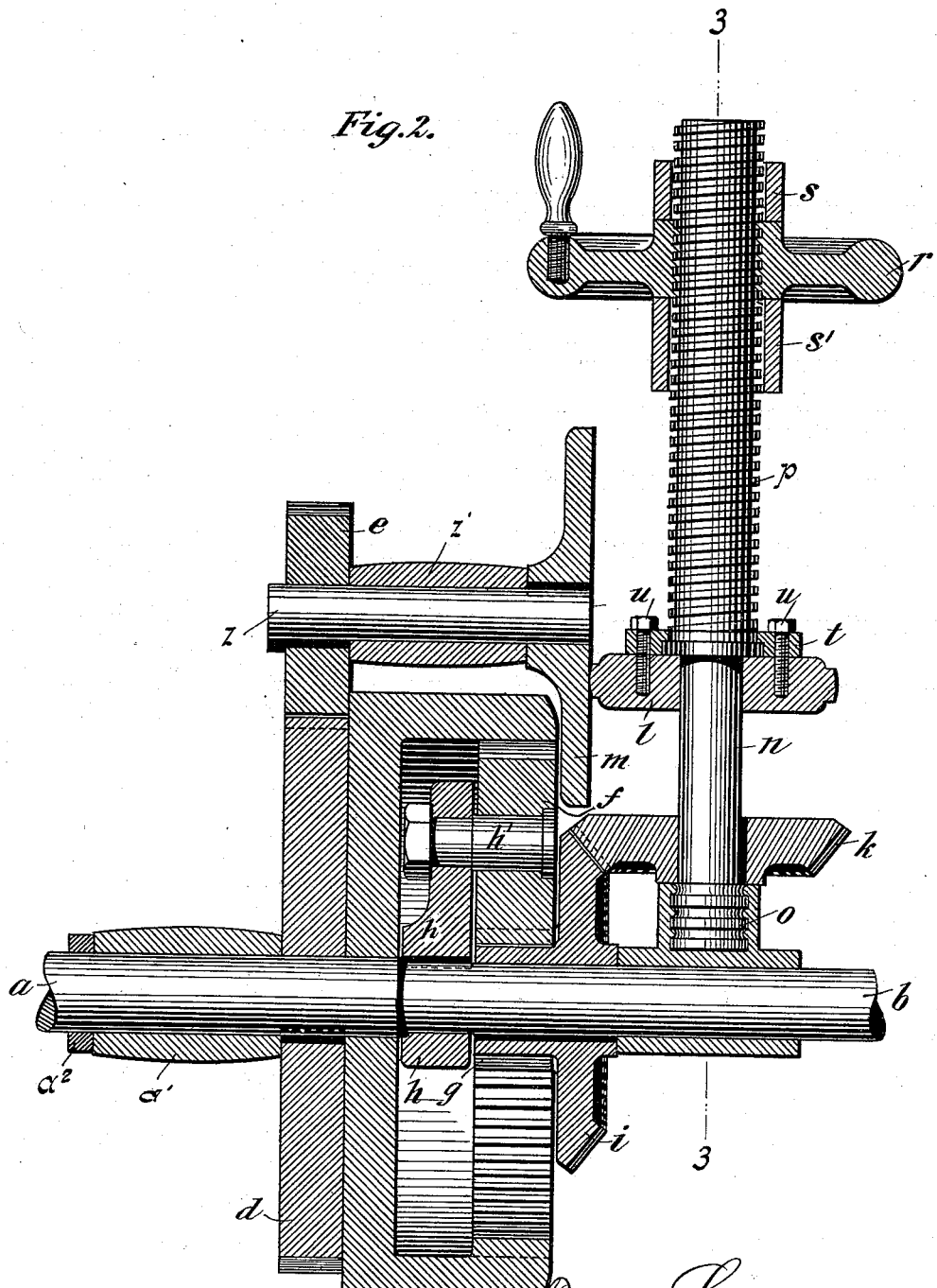

Figure 1 is an elevation of my improved transmission-gearing. Fig. 2 is a vertical cross-section on the line 2 2, indicated in Fig. 3. Fig. 3 is a similar section taken on the lines 3 3, indicated in Fig. 2. Fig. 4 is a horizontal section on the line 4 4, indicated in Fig. 3. Fig. 5 is an elevation of a modified form of the transmission-gear. Fig. 6 is a horizontal section thereof. Fig. 7 is a section on line 7 7, indicated in Fig. 5. Fig. 8 is a section of the speed-governing mechanism for automatically changing the speed according to load, part of the governing mechanism being shown in Fig. 5 in elevation. Fig. 9 is a sectional view of the load-pulley, showing the clutch part of its hub. Fig. 10 is an end view thereof. Fig. 11 is an end view of the sliding sleeve seen from the sectional line 11 11, indicated in Fig. 8, toward the load-pulley. Fig. 12 is a detail of the device for rotating the governing mechanism with the driven shaft.

Similar letters of reference indicate corresponding parts in all views.

In the construction shown in Figs. 1 to 4, inclusively, the driving-shaft $a$ is pillowed in suitable bearings $a'$ and secured in position by collars $a^2$, placed adjoining the bearings. These bearings, collars, &c., may be of any of the well-known types and are not shown in the drawings. Only the bearing and collar close adjoining the gearing are shown, the brackets or standards supporting the bearings being also omitted. To this shaft $a$ are secured the gear-wheel $d$ and the gear-wheel $c$, which latter has the gears cut on its inner periphery, as clearly shown in the drawings. These gear-wheels may also be screwed together or made in one. Gear-wheel $c$ transmits the motion to shaft $b$ by means of the pinion $f$, set on crank-pin $h'$, crank $h$ being keyed to the shaft $b$. The gear $g$, which is cut on the periphery of the extended hub of bevel-gear $i$, serves as a resistance to the loose motion of pinion $f$. Without such resistance this pinion would simply revolve as an idle-wheel loosely around the crank-pin $h'$ and the driven shaft $b$ would not revolve. On this principle the construction of my transmission-gear for variable speed is based. It is evident that the speed of shaft $b$ will depend on the speed of the resistance gear-wheel $g$ and also on the direction in which this wheel $g$ will revolve. When running in the same direction as wheel $c$, it will accelerate the revolutions of shaft $b$ and retard its speed when its motion is reversed.

The resistance-wheel $g$ is driven by beveled gears $k$ and $i$, the former being secured to shaft $n$ and the latter secured to (or made in one piece with) the wheel $g$. Gear-wheel $k$ is driven by the friction-disks $m$ and $l$, which obtain their motion from gear-wheels $d$ and $e$. Disk $m$ and gear-wheel $e$ are keyed to shaft $z$, pillowed in bearings $z'$. The speed of disk $l$ is governed by its position relatively to the center of disk $m$, and this is changed by the following mechanism:

Shaft $n$, to which disk $l$ and bevel-gear $k$ are rigidly secured, is pillowed in bearing $o$, supported on shaft $b$ and in the screw-threaded sleeve $p$, sliding in bearings $s$ and $s'$. Disk $l$ is secured to the sleeve $p$ by the flanged collar $t$, screwed to it by screws $u$. Shaft $n$ is provided with a keyway $v$ and disk $l$ with a corresponding key $v'$. By turning hand-wheel $r$, provided with a female screw-thread corresponding with the thread of sleeve $p$, sleeve $p$, and with it disk $l$, is moved up or down on spindle $n$.

When the friction-disk $l$ stands in the center of disk $m$, the resistance-gear $c$ $g$ will stand still and shaft $b$ will revolve at a velocity corresponding to the proportion of gear-wheels $c$ and $g$, which is the same as that of gear-wheels $d$ and $e$. In any position of the disk $l$ below the center of disk $m$ resistance gear-wheel $g$ will be driven in the same direction with wheel $c$, its velocity being increased proportionately to the distance of the disk $l$ from the center of disk $m$. In the same proportion with the increase in the number of revolutions of wheel $g$ the velocity of the driving-shaft $b$ will be increased. By shifting disk $l$ above the center of disk $m$ its motion, and consequently also the motion of wheel $g$, will be reversed, its speed being similarly increased proportionately to the distance of disk $l$ from center of disk $m$. In this case, however, the resistance-wheel $g$, being driven in opposite direction to gear-wheel $c$, will increase the dead motion of pinion $f$ and in the same proportion reduce the speed of crank $h$ and shaft $b$ relatively to the speed of the driving-shaft.

In the modified construction shown in Figs. 5 to 12, inclusively, the driven shaft $b$ is mounted parallel to shaft $a$ and is driven by the gear-wheel $dd$, rigidly secured to driving-shaft $a$ and gearing with the wheel $ee$, mounted on the driven shaft. Gear-wheel $dd$ is driven by the combined action of the gear-wheels $cc$, $ff$, $ff'$, and $gg$. Friction-wheel $l$ is set on the driven shaft $b$, and its position in relation to disk $m$ is changed automatically with the change of the load on pulley $pb$. The end of driving-shaft $a$, somewhat reduced in diameter, is pillowed in the T-bearing $zz'$, wherein also shaft $zz$ is pillowed at right angle to shaft $a$ and cast in one piece with bracket $zz^2$. Keyed to the shaft $a$ is bevel gear-wheel $cc$, gearing with the two beveled gear-wheels $ff$ and $ff'$, mounted loosely on spindles $fs$ and $fs'$, set in the wheel $dd$, loosely mounted on the driving-shaft $a$. Pins $fp$ and $fp'$ hold spindles $fs$ and $fs'$ in position. Opposite the beveled gear-wheel $cc$ is loosely mounted on the T-bearing $zz'$ of the shaft $a$ the beveled resistance gear-wheel $gg$, joined to or cast together with bevel-gear $ii$, the part $gg$ gearing with the wheels $ff$ and $ff'$ and the part $ii$ gearing with the beveled gear-wheel $kk$, keyed to the vertical shaft $zz$, to which also friction-disk $k$ is secured. The functions of these gears are similar to that of the corresponding parts described in the preceding construction. Beveled gear-wheel $cc$, keyed to the shaft $a$ and gearing with wheels $ff$ and $ff'$, is the driving member of the gear. Its action, however, depends on the coöperation of the resistance gear-wheel $gg$. If this wheel be withdrawn, gear-wheel $cc$ would simply rotate wheels $ff$ and $ff'$ in opposite directions, and the cog-wheel $dd$, gearing with $ee$ and driving-shaft $b$, would stand still. When, however, the gear-wheel $gg$ is set in motion and driven in the same direction as the gear-wheel $cc$, it will then act as a resistance to the motion of the wheels $ff$ and $ff'$, and if $gg$ is driven with the same speed as gear-wheel $cc$ these wheels $ff$ and $ff'$ will not rotate around their axis $fs$ and $fs'$, respectively, but will be held firmly between the cogs of the wheels $cc$ and $gg$, whose combined action will then rotate cog-wheel $dd$ on shaft $a$ (or rather with it) and drive cog-wheel $ee$, keyed to the shaft $b$, (and consequently also this shaft $b$,) at a speed proportionate to the diameters of the cog-wheels $dd$ and $ee$. When the resistance gear-wheel $gg$ is driven in the same direction with gear-wheel $cc$, but with a lower speed, the gear-wheels $ff$ and $ff'$ will be rotated so much in dead motion around their axes as will be required to equalize the difference in the speed, and then the speed of wheel $dd$ will be correspondingly retarded. The resistance gear-wheel $gg$ is driven by the beveled gear-wheel $kk$, as explained above, and the direction of its motion, as well as its speed, is governed by the position of friction-wheel $l$ on the disk $m$, secured to the shaft $zz$ by webs or keys $kv$, engaging corresponding slots in the shaft. Disk $m$ rests on flange $ks'$ of the set-screw $ks$, entering the end of the shaft $zz$. By turning this set-screw disk $m$ may be lifted or lowered. This adjustment is used to compensate for wear or to increase the contact-pressure of disk $m$ with wheel $l$. Shaft $zz$ is longitudinally adjustable in its bearings $zz'$ by screw $zs$, whereby the pressure between the two beveled gear-wheels $kk$ and $ii$ is regulated. Friction-wheel $l$ slides longitudinally on driven shaft $b$ and rotates with it, the shaft being provided with a spline $pl$ and the friction-wheel with a corresponding groove. Its position on the shaft and in relation to the center of the friction-disk $m$ is governed by the automatic mechanism arranged on this shaft in connection with the driving-pulley $pb$. Its position may also be changed by the same contrivance (screw-threaded sleeve and hand-wheel) as described and shown in the preceding construction. The speed of the friction-disk $m$ will be correspondingly reduced the farther friction-wheel $l$ will be moved from its center. In the position shown in the drawings the speed of the friction-disk $m$, and consequently of the resistance gear-wheel $gg$, will correspond with the relative normal speed of the two shafts $a$ and $b$ as expressed in the proportion of the gear-wheels $cc$ and $ee$ to each other—that is, both shafts $a$ and $b$ will make the same number of revolutions. When, however, the governing mechanism forces wheel $l$ toward the circumference of the friction-disk $m$, the motion of the shaft $b$ will be retarded. This shifting of the wheel $l$ operates in two ways to reduce the speed of the disk $m$—first, by increasing the circle on which the wheel $l$ travels, and, second, by the consequent reduction of its own speed. It is also obvious that by moving the friction-wheel $l$ only a small distance toward the circumference of the friction-disk $m$ the speed of the shaft $b$ will be considerably reduced. In the same manner by shifting wheel $l$ toward the center of the disk $m$ the speed of the shaft $b$ would be accelerated. The purpose of this construction, however, is to provide a transmission-gearing that will automatically reduce the speed of the driven shaft in proportion to the load, and therefore the shifting of the friction-wheel *l* is limited from a position giving the driven shaft *b* a normal speed (equal number of revolutions with the driving-shaft *b*) toward the circumference of the disk *m*, whereby the speed of the driven shaft *b* is reduced.

The mechanism changing automatically the position of the friction-wheel *l* on the friction-disk *m* is constructed as follows:

Flanged sleeve *q*, loosely mounted on the shaft *b* and having a larger boring between its ends, is connected by rods *bq* to friction-wheel *l*. In the enlarged boring are provided longitudinal slots *q'*, running parallel to the axis of the shaft. Rollers *p* and *p'*, rotating on set-screws *so*, securing dog-collar *o* to the shaft *b*, engage in the longitudinal slots *q'* and cause the sleeve *q* to revolve with the shaft *b*. They do not, however, prevent it from sliding longitudinally on the shaft.

On the outside of the sleeve *q*, near to its flange *qr*, are set rollers *u* and *u'* diametrically opposite each other, roller *u* being above and roller *u'* being below the center of the sleeve.

In the flange *qr* are provided semicircular slots *r*, and in these slots enter segments *ts* of the enlarged hub *t* of pulley *pb*, loosely mounted on shaft *b*, thus forming a clutch between the sleeve *q* and the pulley. Segments *ts* have a sufficiently wide clearance on both ends of the slots *r* to allow the pulley *pb* a swing on the shaft and are provided with spiral ways *tu* and *tu'*, wherein the rollers *u* and *u'* engage.

Collar *pr*, secured to the shaft by set-screw *sb*, holds pulley *pb* in close position to the sleeve *q*, and ball-bearing *br*, provided between the pulley *pb* and collar *pr*, relieves the friction between them. Sleeve *q* is pressed against the clutch of the pulley *pb* by spiral spring *ac*, slid on the shaft *b* and resting against screw-nut collars *bn*, screwed on the shaft. The tension of the spring is adjusted by changing the position of these collars *bn* until friction-wheel *l* is brought in exact position corresponding to the normal load of the pulley *pb*. In this normal position rollers *u* and *u'* will be in the position shown in Fig. 8 at the inner ends of the spiral ways *tu* and *tu'*, respectively, and the flange *qr* is pressed in brake-ring *s*, provided to prevent an increase of the speed of shaft *b* beyond the normal speed when there is no load on the pulley.

When the speed-governing mechanism is adjusted, the tension of the spring *ac* is slightly reduced to cause the pulley *pb* to lag slightly under its normal load, and thereby to force flange *qr* from brake-ring *s*. When the load on the pulley *pb* is increased, its motion will be further retarded, and by this change in the relative position of pulley *pb* and sleeve *q* rollers *u* and *u'* will be forced to move outward on the spiral ways *tu* and *tu'*, thereby pushing sleeve *q* against the spring *ac* until the strain produced by the increased load will be balanced by the reaction of the spring *ac*. Friction-wheel *l*, being rigidly connected to the sleeve *q*, will be thus shifted toward the circumference of the friction-disk *m*, and thereby the speed of this friction-disk and of the resistance gear-wheel *gg* will be reduced. This again will, as explained above, increase the dead motion of gear-wheels *ff* and *ff'* whereby, again, the speed of the cog-wheel *dd*, and consequently also of the shaft *b*, will be correspondingly reduced. When the load on the pulley *pb* is again reduced, sleeve *q* will successively return, yielding to the pressure of spring *ac* in its normal position, and the speed of shaft *b* will correspondingly increase.

Brake-ring *s* is provided to prevent an undue increase of the speed of shaft *b* when there is no load on the pulley. My improved transmission-gearing will be found well adaptable for counter-shafts of machines running under variable load—as planers, presses, shears, punchers, printing-presses, &c.—and especially for motors propelling cars and vehicles and for other similar purposes.

In my specification I have endeavored to describe and illustrate only the practical embodiment of my invention in its construction and operation without regard to any special use. The relative positions of the several parts will probably have to be changed to meet specific requirements. This description, however, renders it obvious to all familiar with the art how to adapt the construction for some particular purpose.

I claim as my invention and desire to secure by Letters Patent—

1. A mechanism for transmitting motion at variable speed, comprising a driving and a driven shaft, a gear-wheel secured to the driving-shaft, a crank secured to the driven shaft, a stud set in the end of the crank, a pinion set rotatably on the stud and gearing with the gear-wheel secured to the driving-shaft, a gear-wheel set rotatably on the driven shaft and gearing with the pinion, and means for rotating this gear-wheel on the driven shaft.

2. The combination with mechanism for transmitting motion with a variable speed from a driving-shaft running at a constant speed, comprising a driving and a driven shaft, a gear-wheel secured to the driving-shaft, a crank secured to the driven shaft, a stud set in the end of the crank, a pinion set rotatably on the stud and gearing with the gear-wheel secured to the driving-shaft, a gear-wheel set rotatably on the driven shaft and gearing with the pinion, of a gear-wheel, set rotatably on the driven shaft and secured to the gear-wheel gearing with the pinion, a cog-wheel secured to the driving-shaft, an auxiliary shaft pillowed parallel to the driving-shaft, a cog-wheel secured to the auxiliary shaft and gearing with the cog-wheel set on the driving-shaft, a friction-disk rigidly secured to the end of the auxiliary shaft, a second auxiliary shaft pillowed at right angle to the driven shaft, a friction-wheel set on this auxiliary shaft and engaging with the friction-disk, a beveled gear-wheel secured to the same auxiliary shaft and gearing with the beveled gear-wheel secured to the gear-wheel set rotatably on the driven shaft, and of means for gradually shifting the friction-wheel in relation to the friction-disk.

3. The combination with a transmission-gearing for driving a shaft with variable speed from a shaft having a constant speed, of mechanism for automatically changing the speed of the gearing in accordance with the load on the driven shaft, comprising an auxiliary shaft, a gear-wheel and a friction-disk secured to the auxiliary shaft, a flanged sleeve, sliding longitudinally on the driven shaft, and having an enlarged boring between its ends, longitudinal slots in the enlarged boring, a dog-collar, rollers rotating on set-screws, securing the collar to the shaft, and engaging in the slots of the sleeve, rods connecting the sleeve to the friction-wheel; semi-circular slots in the flange of the sleeve, driving-pulley mounted loosely on the shaft, and having its enlarged hub shaped into two segments, engaging in the semicircular slots of the flange of the sleeve; spiral ways provided in the segments, rollers set on studs, secured diametrically opposite in the sleeve, and engaging in the spiral ways, provided in the segments, a spiral spring, slid on the shaft and pressing the sleeve against the pulley, screw-threaded collars, screwed on the shaft and sustaining the spring in position, and a stationary collar adjustably secured to the shaft beyond the load-pulley and holding it in position against the action of the spring, and a brake-ring, surrounding the flange of the sleeve and acting as a load on the driven shaft when the driven pulley is relieved.

In witness that I claim the improvements described in the foregoing specification I have signed my name in the presence of two subscribing witnesses.

FREDERICK SCHNEIDER.

Witnesses:
F. CARRICK,
GEORGE M. FLETCHER.